(12) United States Patent
Kyung

(10) Patent No.: US 9,610,921 B2
(45) Date of Patent: Apr. 4, 2017

(54) VEHICLE INTRUSION DETECTION SYSTEM AND VEHICLE INTRUSION DETECTION METHOD

(71) Applicant: DAESUNG ELECTRIC CO., LTD, Ansan-si (KR)

(72) Inventor: Tae Ho Kyung, Hwaseong-si (KR)

(73) Assignee: DAESUNG ELECTRIC CO., LTD, Ansan-si (KR)

( * ) Notice: Subject to any disclaimer, the term of this patent is extended or adjusted under 35 U.S.C. 154(b) by 289 days.

(21) Appl. No.: 14/413,009

(22) PCT Filed: May 30, 2013

(86) PCT No.: PCT/KR2013/004731
§ 371 (c)(1),
(2) Date: Jan. 6, 2015

(87) PCT Pub. No.: WO2014/010827
PCT Pub. Date: Jan. 16, 2014

(65) Prior Publication Data
US 2015/0166010 A1 Jun. 18, 2015

(30) Foreign Application Priority Data
Jul. 10, 2012 (KR) .................. 10-2012-0075182

(51) Int. Cl.
*B60R 25/10* (2013.01)
*B60R 25/30* (2013.01)
(Continued)

(52) U.S. Cl.
CPC ........ *B60R 25/302* (2013.01); *B60R 25/1004* (2013.01); *B60R 25/1009* (2013.01);
(Continued)

(58) Field of Classification Search
CPC .............. B60R 25/302; B60R 25/1004; B60R 25/1009; B60R 25/31; B60R 25/32;
(Continued)

(56) References Cited

U.S. PATENT DOCUMENTS 5,877,897 A * 3/1999 Schofield ............... H04N 7/183
348/E7.086
6,236,307 B1 5/2001 Kurano
(Continued)

FOREIGN PATENT DOCUMENTS

CN 1287934 3/2001
CN 201685785 12/2010
(Continued)

*Primary Examiner* — Hai Phan
*Assistant Examiner* — Zhen Y Wu
(74) *Attorney, Agent, or Firm* — Gokalp Bayramoglu

(57) ABSTRACT

The present invention relates to a vehicle intrusion detection system and vehicle intrusion detection method, which are capable of effectively detecting various types of vehicle intrusions, minimizing incorrect detections, and lowering manufacturing costs of a system, and the vehicle intrusion detection system comprises: a first sensor unit which detects it signal or light reflected off an object to generate a first detection signal, and which outputs the generated first detection signal; a control unit which controls an operation of the first sensor unit and receives the first detection signal from the first sensor unit; and a second sensor unit which detects a rotation, an inclination, or impact of the vehicle to generate a second detection signal, and which inputs the generated second detection signal to the control unit, wherein the first sensor unit and the second sensor unit are mounted on a single module.

8 Claims, 12 Drawing Sheets

(51) Int. Cl.
*B60R 25/32* (2013.01)
*B60R 25/34* (2013.01)
*B60R 25/31* (2013.01)
*G08B 13/16* (2006.01)
*G08B 29/18* (2006.01)
*G08B 13/02* (2006.01)
*G08B 13/04* (2006.01)

(52) U.S. Cl.
CPC .............. *B60R 25/31* (2013.01); *B60R 25/32* (2013.01); *B60R 25/34* (2013.01); *G08B 13/02* (2013.01); *G08B 13/04* (2013.01); *G08B 13/1645* (2013.01); *G08B 29/188* (2013.01)

(58) Field of Classification Search
CPC ........ B60R 25/34; G08B 13/02; G08B 13/04; G08B 13/1645; G08B 13/188
USPC .................................................... 340/426.24
See application file for complete search history.

(56) References Cited

U.S. PATENT DOCUMENTS

| | | | | |
|---|---|---|---|---|
| 6,337,625 | B1* | 1/2002 | Taylor | B60R 25/1009 340/541 |
| 6,940,397 | B1* | 9/2005 | Le Mire | B60R 25/1004 180/287 |
| 7,498,927 | B1 | 3/2009 | Kaji et al. | |
| 2002/0105417 | A1 | 8/2002 | Gillis et al. | |
| 2003/0004629 | A1* | 1/2003 | Cooper | B60R 21/0152 701/45 |
| 2004/0263323 | A1* | 12/2004 | Seike | B60R 25/1004 340/426.1 |
| 2009/0016162 | A1* | 1/2009 | Takagi | G01S 15/523 367/99 |
| 2011/0163721 | A1* | 7/2011 | Van Wiemeersch | B60R 16/033 320/128 |
| 2012/0143395 | A1* | 6/2012 | Yamada | B60W 40/08 701/1 |

FOREIGN PATENT DOCUMENTS

| | | |
|---|---|---|
| CN | 102001324 | 4/2011 |
| DE | 102005020820 | 11/2006 |
| JP | 1983-035692 | 3/1983 |
| JP | 1986-087156 | 5/1986 |
| JP | 2000-006761 | 1/2000 |
| JP | 2001-018758 | 1/2001 |
| JP | 2002-071833 | 3/2002 |
| JP | 2002-373386 A | 12/2002 |
| JP | 2004-062386 | 2/2004 |
| JP | 2004-161121 | 6/2004 |
| JP | 2005-001642 A | 1/2005 |
| JP | 2005-044180 | 2/2005 |
| JP | 2008-217082 | 9/2008 |
| JP | 2008250925 A | 10/2008 |
| JP | 2008-278066 | 11/2008 |
| JP | 2010-210500 | 9/2010 |
| JP | 2011154444 A | 8/2011 |
| KR | 100190403 | 6/1999 |
| KR | 20050074324 A | 7/2005 |
| KR | 1020070019391 | 2/2007 |
| KR | 10-2011-0024798 A | 3/2011 |
| KR | 10-2012-0016881 A | 2/2012 |
| WO | WO9319385 | 9/1993 |
| WO | WO0192070 | 12/2001 |

\* cited by examiner

FIG. 12

| ANGLE DETERMINATION | 1 | 2 | 3 | 4 | 5 |
|---|---|---|---|---|---|
| +X | 9 | 14 | 0 | 19 | 18 |
| -X | 0 | 0 | 0 | 0 | 0 |
| +Y | 0 | 0 | 0 | 0 | 0 |
| -Y | 0 | 0 | 0 | 0 | 0 |

VEHICLE INTRUSION DETECTION SYSTEM AND VEHICLE INTRUSION DETECTION METHOD

TECHNICAL FIELD

The present invention relates to a vehicle intrusion detection system and method, and more particularly, to a vehicle intrusion detection system which is capable of effectively detecting a variety of types of vehicle intrusion, minimizing an erroneous detection, and lowering the manufacturing cost of the system and a vehicle intrusion detection method used in the system.

BACKGROUND ART

Today, the performance and specification of a vehicle robbery prevention system are required to maintain the safety state of a vehicle for situations inside and outside the vehicle that is being parked. Accordingly, a recent vehicle robbery prevention system has a function of maintaining the safety of a vehicle by generating visual and auditory effects around the vehicle when various situations such as the detection of the breaking of a window for intrusion, the detection of an article robbery behavior within a vehicle, the detection of a tire theft in a vehicle that is being parked, and the detection of the illegal towaway and movement of a vehicle, are generated.

For example, Thatcham, an automotive research center of England, has organized a separate vehicle security department in order to improve vehicle robbery prevention performance and continues to move a wide variety of operations. Furthermore, Denso Corporation of Japan proposes a technology for maintaining the security of a vehicle using a robbery vehicle location tracker, an ultrasonic sensor for detecting an illegal trespasser to a vehicle, a glass breakage sensor, an inclination sensor for detecting an inclined vehicle body, and an impact sensor for detecting an impact force applied to a vehicle. Such a technology of Denso is disclosed in Korean Patent Application Publication No. 10-2005-0074324 (Jul. 18, 2005).

However, a conventional ultrasonic sensor for detecting intrusion within a vehicle is problematic in that a battery is excessively discharged in order to continuously generate ultrasonic waves. Furthermore, the ultrasonic sensor frequently erroneously detects a change in the signal, detected within a vehicle due to an external simple impact, as indoor intrusion within the vehicle. In order to prevent such a problem, in the conventional ultrasonic sensor, a signal out of a specific reception level range may be considered to be noise and removed. In such a case, a transmitting level needs to be increased by a specific level or more and maintained because receiving sensitivity from which a specific reception level range has been removed needs to maintain a specific size or more. Accordingly, there is a disadvantage in that the controllable range of the sensor is limited in controlling the receiving sensitivity of the ultrasonic sensor. Furthermore, there is a problem in that battery consumption is further increased if the receiving sensitivity maintains a specific level or more.

Furthermore, some of conventional vehicle robbery prevention devices detect the generation of an impact against a vehicle or the inclination of a vehicle using an inclination sensor or an impact sensor. In such a case, there is a problem in that the sensor sensitively responds to an external simple impact and malfunctions.

DISCLOSURE

Technical Problem

The present invention has been made to solve the aforementioned problems occurring in the prior art, and an object of the present invention is to provide a vehicle intrusion detection system and method, which are capable of improving intrusion detection performance by suppressing the erroneous detection of a first sensor using a second sensor for detecting an impact again a vehicle or a movement tilt of the vehicle.

Furthermore, an object of the present invention is to provide a vehicle intrusion detection system and method, which are capable of lowering the manufacturing cost of the system and effectively detecting vehicle intrusion by fabricating the first sensor and the second sensor in the form of a single module and installing the single module in the ceiling part of a vehicle.

Technical Solution

In order to achieve the technical objects, a vehicle intrusion detection system in accordance with an aspect of the present invention is a vehicle intrusion detection system which is mounted on a vehicle and detects intrusion within the vehicle, including a first sensor unit which detects light or a signal reflected by an object, generates a first detection signal, and outputs the generated first detection signal; a control unit which controls the operation of the first sensor unit and receives the first detection signal from the first sensor unit; and a second sensor unit which detects the rotation or inclination of the vehicle or an impact against the vehicle, generates a second detection signal, and inputs the generated second detection signal to the control unit. In this case, the first sensor unit and the second sensor unit are mounted on a single module.

In an embodiment, the single module has the overhead console form of a vehicle.

In an embodiment, the first sensor unit includes a transmitter which outputs light or a signal of a specific cycle; a receiver which receives light or a signal reflected by an object; a signal processing unit which applies a transmitting signal to the transmitter in response to the signal processing control signal of the control unit; and a signal analysis unit which analyzes a signal received through the receiver.

In an embodiment, the first sensor unit includes an ultrasonic sensor equipped with a transmitter and a receiver, and the second sensor unit includes a gyro sensor or an impact sensor.

In an embodiment, if vehicle intrusion is detected based on the first detection signal, the control unit increases the transmitting level of the transmitter higher than the previous transmitting level of the transmitter when intrusion is investigated and investigates vehicle intrusion again.

In an embodiment, the control unit compares the current pattern data of the first sensor unit with the previously stored pattern data of the second sensor unit and detects intrusion within the vehicle or an impact against the vehicle by determining whether an impact has been applied to the vehicle based on a result of the comparison.

A vehicle intrusion detection method in accordance with an aspect of the present invention is a vehicle intrusion detection method of detecting vehicle intrusion in a vehicle intrusion detection system including a first sensor unit which detects light or a signal reflected by an object, generates a first detection signal, and outputs the generated first detection signal, a control unit which controls the operation of the first sensor unit and receives the first detection signal from the first sensor unit, and a second sensor unit which detects the rotation or inclination of the vehicle or an impact against the vehicle, generates a second detection signal, and inputs the generated second detection signal to the control unit. The vehicle intrusion detection method includes a first step of investigating vehicle intrusion based on the first detection signal; a second step of, when the vehicle intrusion is detected based on the first detection signal, increasing the transmitting level of the transmitter of the first sensor unit higher than the previous transmitting level of the transmitter when intrusion detection is investigated and investigating vehicle intrusion again; and a third step of, if the vehicle intrusion is detected for a specific time or more in the second step, comparing the current first pattern data of the first sensor unit with the previously second pattern data of the second sensor unit and detecting intrusion within the vehicle or an impact against the vehicle by determining whether there is an impact.

In an embodiment, the first pattern data includes a voltage-time table indicating that reception data input to the control unit from the first sensor unit and sampled at a preset sampling time interval from the first sensor unit belong to which voltage range in figures. The second pattern data includes corresponding integer values obtained by averaging sampling data for a change of an angle sampled in plural times at specific intervals for a specific time and classifying the averaged values into specific steps. In such a case, the third step includes a step of detecting whether there is intrusion within the vehicle by comparing a number of the first pattern data with a preset first reference value and comparing the integer value of the second pattern data with a preset second reference value.

Advantageous Effects

In accordance with the present invention, there can be provided the vehicle intrusion detection system and method with high efficiency and high performance, which are capable of detecting a variety of types of vehicle intrusion, such as the detection of the breaking of a window, the detection of intrusion within a vehicle, the detection of an article robbery behavior within a vehicle, the detection of a tire theft in a vehicle that is being parked, and the detection of the illegal towaway and movement of a vehicle, suppressing erroneous detection in detecting vehicle intrusion, and lowering the manufacturing cost of the system using the second sensor unit.

That is, erroneous detection in a movement or tilt of a vehicle occurring due to an external simple impact or shaking can be minimized by distinguishing an external impact from vehicle intrusion and determining such an external impact and vehicle intrusion based on the detection signal of the second sensor unit (a gyro sensor, etc.) and the detection signal of the first sensor (an ultrasonic sensor, etc.). Accordingly, performance of the system can be improved, and a variety of types of vehicle intrusion can be effectively detected. For example, performance of a basic vehicle intrusion detection function can be improved and erroneous detection can be minimized using the second sensor unit. Furthermore, an extended vehicle intrusion detection function, such as the monitoring of vehicle tires deviating from the ground or the detection of illegal towaway or movement, can be performed using the second sensor unit.

Furthermore, in accordance with the vehicle intrusion detection system of the present invention, a single module on which the first sensor unit and the second sensor unit are mounted is installed in the Over Head Console (OHC) of a vehicle. Accordingly, a production cost can be lowered through modulation, and intrusion into a first column to a third column within a vehicle can be effectively monitored using a single module installed in the OHC.

DESCRIPTION OF DRAWINGS

FIG. 12 is a graph schematically illustrating the intrusion detection range of the second sensor unit of FIG. 1.

MODE FOR INVENTION

Hereinafter, preferred embodiments of the present invention are described in detail with reference to accompanying drawings.

In the following description, a term 'vehicle intrusion detection' basically means intrusion detection inside a vehicle, but may include the detection of a variety of types of vehicle-related robbery behaviors, such as the detection of the breaking of a window for intrusion, the detection of an article robbery behavior within a vehicle, the detection of a tire theft in a vehicle that is being parked, and the detection of the illegal towaway and movement of a vehicle.

Figure 1:
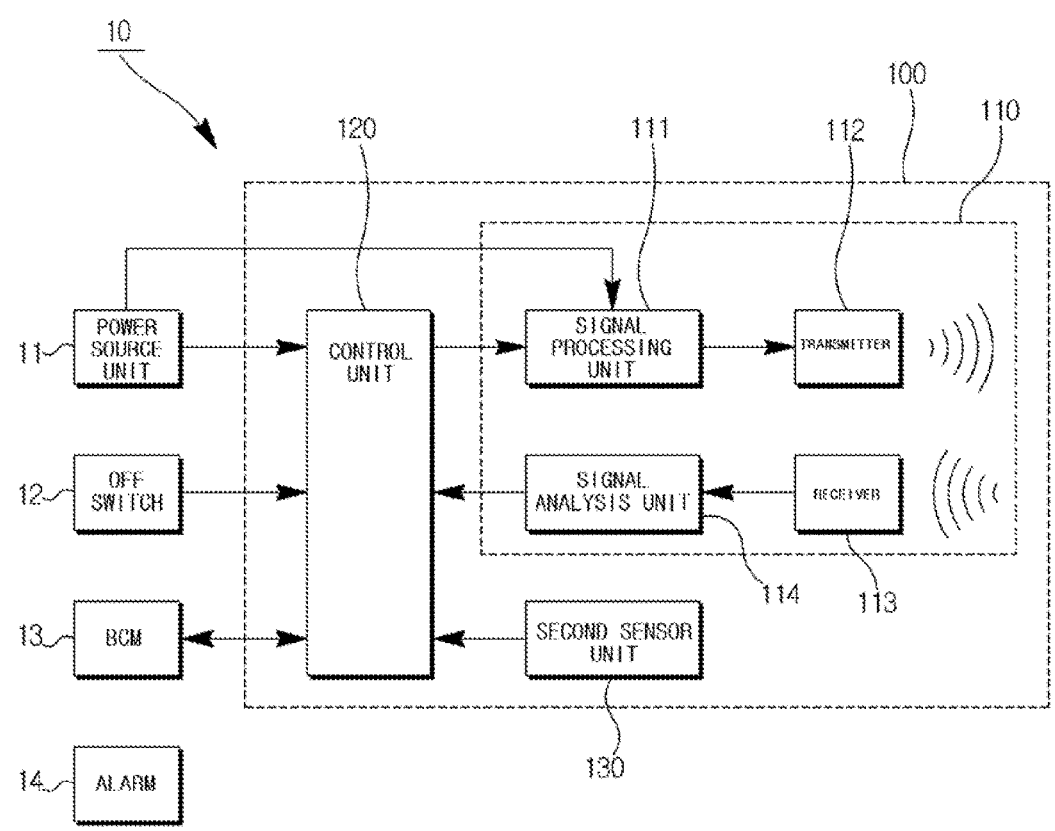
FIG. 1 is a schematic block diagram of a vehicle intrusion detection system in accordance with an embodiment of the present invention.

FIG. 1 is a schematic block diagram of a vehicle intrusion detection system in accordance with an embodiment of the present invention.

Referring to FIG. 1, the vehicle intrusion detection system 100 according to the present embodiment is equipped with a first sensor unit 110, a control unit 120, and a second sensor unit 130. The vehicle intrusion detection system 100 preferably is installed within a vehicle 10, in particular, on the upper side (a vehicle ceiling, etc.) within the vehicle for the effective detect intrusion of the first sensor unit 110.

The first sensor unit 110 sends light or a signal (a sound wave, etc.) of a specific cycle and amplitude, detects light or a signal reflected by an object, generates a first detection signal, and outputs the generated first detection signal. An ultrasonic sensor, etc. may be used as the first sensor unit 110.

The control unit 120 is connected to the first sensor unit 110, and it controls the operation of the first sensor unit 110 and receives a first detection signal from the first sensor unit 110. The control unit 120, together with the first sensor unit 110, may be fabricated in the form of a single module. Furthermore, the control unit 120 may be mounted on the Electronic Control Unit (ECU) of a vehicle.

The second sensor unit 130 detects a vehicle movement, such as rotation or a tilt, or a vehicle vibration or impact, generates a second detection signal, and inputs the generated second detection signal to the control unit 120. A gyro sensor, etc. may be used as the second sensor unit 130.

If the first sensor unit 10 is equipped with an ultrasonic sensor, the first sensor unit 110 may be configured to include a signal processing unit 111, a transmitter 112, a receiver 113, and a signal analysis unit 114.

In this case, the signal processing unit 111 corresponds to means for applying a transmitting signal to the transmitter 112 or an element for performing a function corresponding to such a means in response to the signal processing control signal of the control unit 120. The signal processing unit 110 may be implemented as an inverter for receiving a Pulse Width Modulation (PWM) pulse signal from the control unit 120, generating a combination of a first signal inverted from the pulse signal or a second signal not inverted from the pulse signal and the first signal, and transferring the combination of the signals to the transmitter 112. The transmitter 112 sends an ultrasonic signal of a specific cycle in response to the transmitting signal of the signal processing unit 111.

The receiver 113 receives a reflected wave reflected by the inner wall of a vehicle or an object, of an ultrasonic signal transmitted by the transmitter 112. The signal analysis unit 114 amplifies a reflected wave received by the receiver 113, detects an envelope in the amplified reflected wave, and supplies the detected envelope to the control unit 120. Elements that may be adopted in such a signal analysis unit 114 are described later.

In the vehicle detection system 100 according to the present embodiment, the control unit 120 may be connected to a power source unit 11, an off switch 12, and a Body Control Module (BCM) 13. Furthermore, the control unit 120 may be connected to an LED display (not illustrated) for displaying the state of the off switch 12 in response to a signal from the control unit.

In this case, the off switch 12 is a user interface for deactivating or turning off the alert mode of the vehicle intrusion detection system. When a user presses the off switch 12, the control unit 120 of the vehicle intrusion detection system 100 is deactivated, and thus the vehicle intrusion detection system 100 does not enter the alert mode for vehicle intrusion detection.

The BCM 13 corresponds to that a plurality of Electronic Control Units (ECU) applied to various devices of a vehicle is integrated into a single central control device. The BCM 13 may drive an alarm 14 based on a signal from the control unit 120 and send visual and/or auditory alarms around a vehicle.

Furthermore, the power source unit 12 supplies different voltages to the elements of the vehicle intrusion detection system, and it may be equipped with a battery, a batter protection device, a voltage regulator, a voltage divider, or a combination of them. The battery protection device may be equipped with a surge protective device for protecting the battery or the elements of the vehicle intrusion detection system against an instantaneous sudden current (surge).

Figure 2:
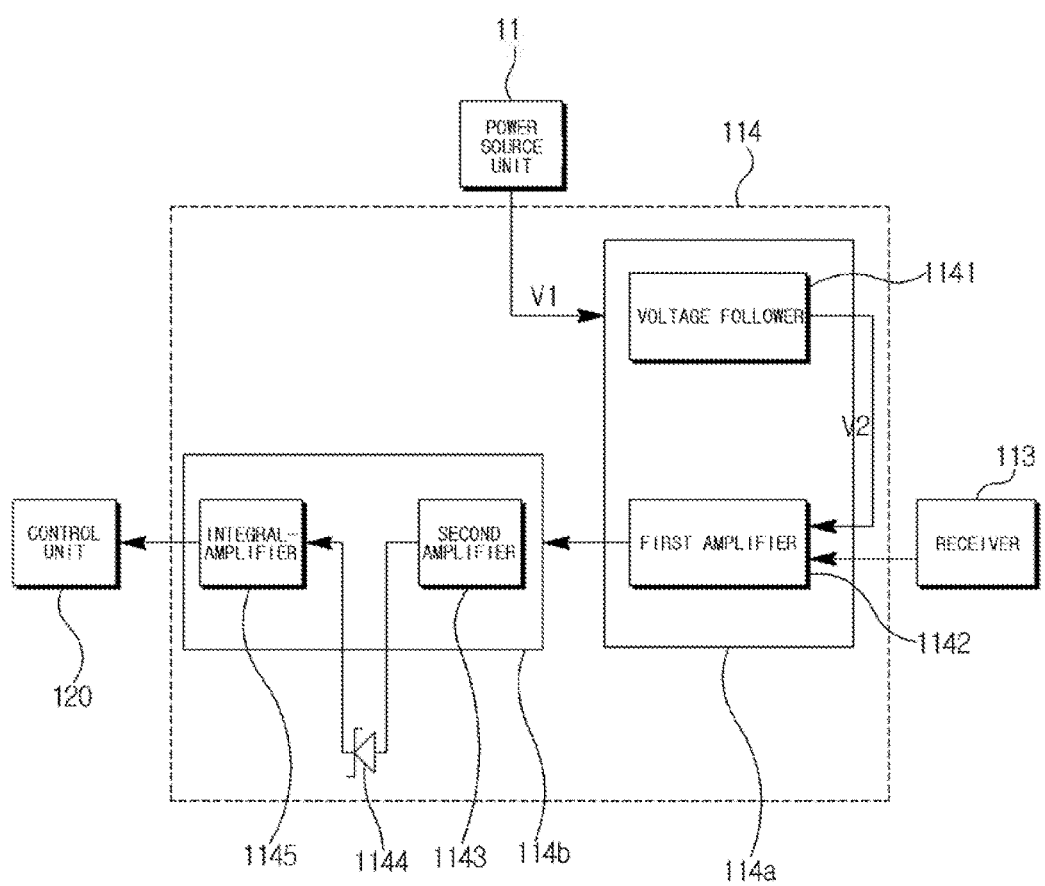
FIG. 2 is a schematic block diagram of a signal analysis unit that may be adopted in the vehicle intrusion detection system of FIG. 1.

FIG. 2 is a schematic block diagram of the signal analysis unit that may be adopted in the vehicle intrusion detection system of FIG. 1.

Referring to FIG. 2, the signal analysis unit 114 according to the present embodiment is equipped with a voltage follower 1141, a first amplifier 1142, a second amplifier 1143, a detector 1144, and an integral-amplifier 1145.

The voltage follower 1141 and the first amplifier 1142 amplify an input signal from the receiver 113 based on a reference voltage from the power source unit 11. In the present embodiment, the voltage follower 1141 and the first amplifier 1142 preferably are an Op Amp 114*a* that has linearity and generates an output signal "1" with respect to an input signal "1".

The second amplifier 1143, the detector 1144, and the integral-amplifier 1145 amplify an input signal from the first amplifier 1142. In the present embodiment, the second amplifier 1143, the detector 1144, and the integral-amplifier 1145 preferably have the characteristics of a rail-to-rail Op Amp 114*b*.

An operating process of the signal analysis unit 114 is described in brief below.

When a specific voltage V1 from the power source unit 11 is input to the voltage follower 1141 and a reference voltage V2 from the voltage follower 1141 is input to the first amplifier 1142, a reflected wave received from the receiver 113 is amplified by the first amplifier 1142. A signal amplified by the first amplifier 1142 is amplified by the second amplifier 1143 again, and it passes through the detector 1144. At this time, the detector 1144 demodulates only the outer line of the passing signal. The demodulated signal is amplified by the integral-amplifier 1145 and input to the control unit 120. The control unit 120 is equipped with the port of an analog digital converter for converting an input analog signal from the integral-amplifier 1145 into a digital signal.

A reflected wave corresponds to a signal that includes only a coupling signal reflected and fed back irrespective of a motion of an object within a vehicle when there is no vehicle intrusion and that does not have any change compared to a previously analyzed reflected wave and corresponds to a composite wave of a reflected wave and coupling signal that are reflected by an object and fed back when there is vehicle intrusion. An analog signal that may be determined by the control unit 120 may be generated by detecting a reflected wave in an envelope.

In the aforementioned operating process of the signal analysis unit 114, if there is no change in a reflected wave received from the receiver 113, the reflected wave is output in a specific level because an envelope form is not demodulated by the detector 1144. If there is a change of a specific size or more in a reflected wave received from the receiver 113, the reflected wave is output in the form of a signal having a great change of amplitude or a great change of frequency because it is demodulated by the detector 1144.

Figure 3:
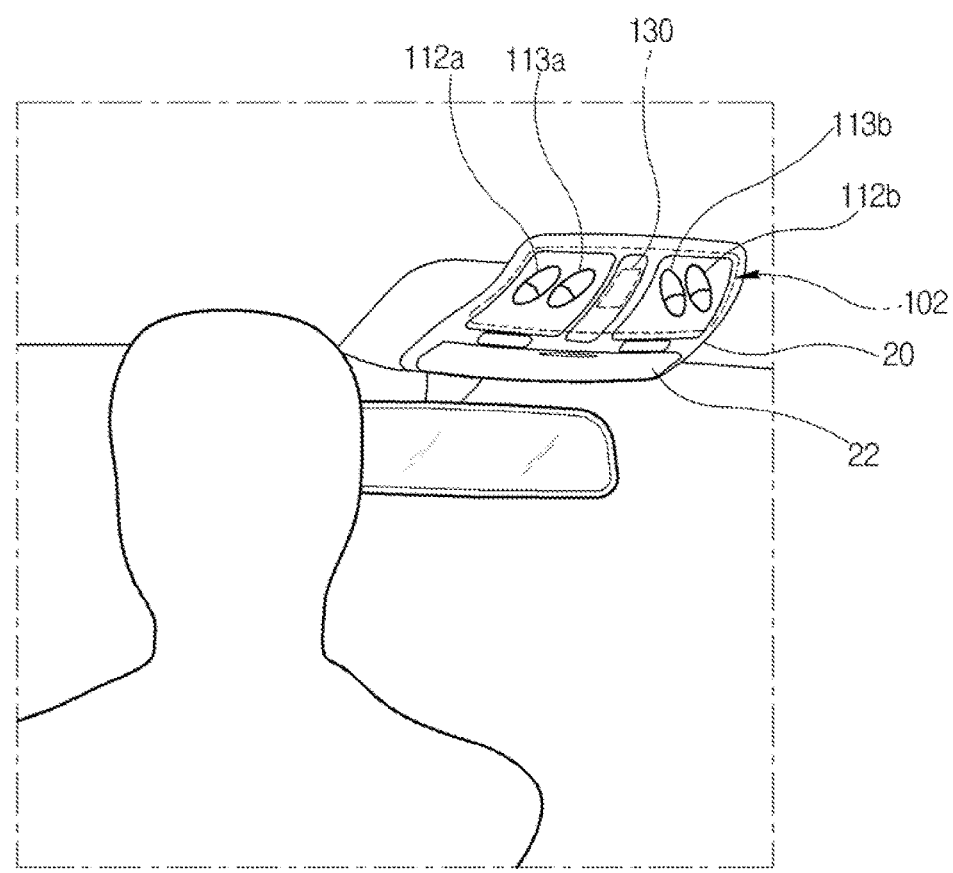
FIG. 3 is a diagram illustrating an embodiment of a state in which the sensor module of the vehicle intrusion detection system of FIG. 1 has been mounted on a vehicle.

FIG. 3 is a diagram illustrating an embodiment of a state in which the sensor module of the vehicle intrusion detection system of FIG. 1 has been mounted on a vehicle.

In the vehicle intrusion detection system 100 described above with reference to FIG. 1, the first sensor unit 110 and the second sensor unit 130 may be formed into a single sensor module this case, the control unit 120 may also be mounted on the single sensor module.

For example, as illustrated in FIG. 3, a single sensor module 102 of the present embodiment is installed in the overhead console 20 of a vehicle. The single sensor module 102 is equipped with a $(1A)^{th}$ sensor unit for monitoring an area placed on the left of the central part of the vehicle in the first to third columns of the vehicle and a $(1B)^{th}$ sensor unit for monitoring an area placed on the right of the central part of the vehicle in the first to third columns of the vehicle.

In this case, the $(1A)^{th}$ sensor unit is equipped with a first ultrasonic transmitter 112a and a first ultrasonic receiver 113a, and the $(1B)^{th}$ sensor unit is equipped with a second ultrasonic transmitter 112b and a second ultrasonic receiver 113b. In FIG. 3, the second sensor unit 130 is marked by a dotted line along with the single sensor module 102 embedded in the overhead console 20.

In general, the aforementioned overhead console 20 is installed at the front of a ceiling surface between a driver's seat and a passenger seat within a vehicle and is equipped with lamps for illuminating the driver's seat and the passenger seat, a pouch 22 capable of receiving sunglasses, a mirror for dialogues, etc. In the present embodiment, however, the single sensor module 102 on which the first sensor unit and second sensor unit of the vehicle intrusion detection system have been mounted is mounted on the overhead console 20 so that the fabrication, installation, and operation of the system are efficiently performed through the easy standardization of a single module.

Furthermore, in the vehicle intrusion detection system according to the present embodiment, the sensor module equipped with the first sensor unit and the second sensor unit is installed in the overhead console. Accordingly, there is an advantage in that a cost can be reduced because a separate unit for installing the intrusion detection system is not required with respect to a vehicle.

Figure 4:
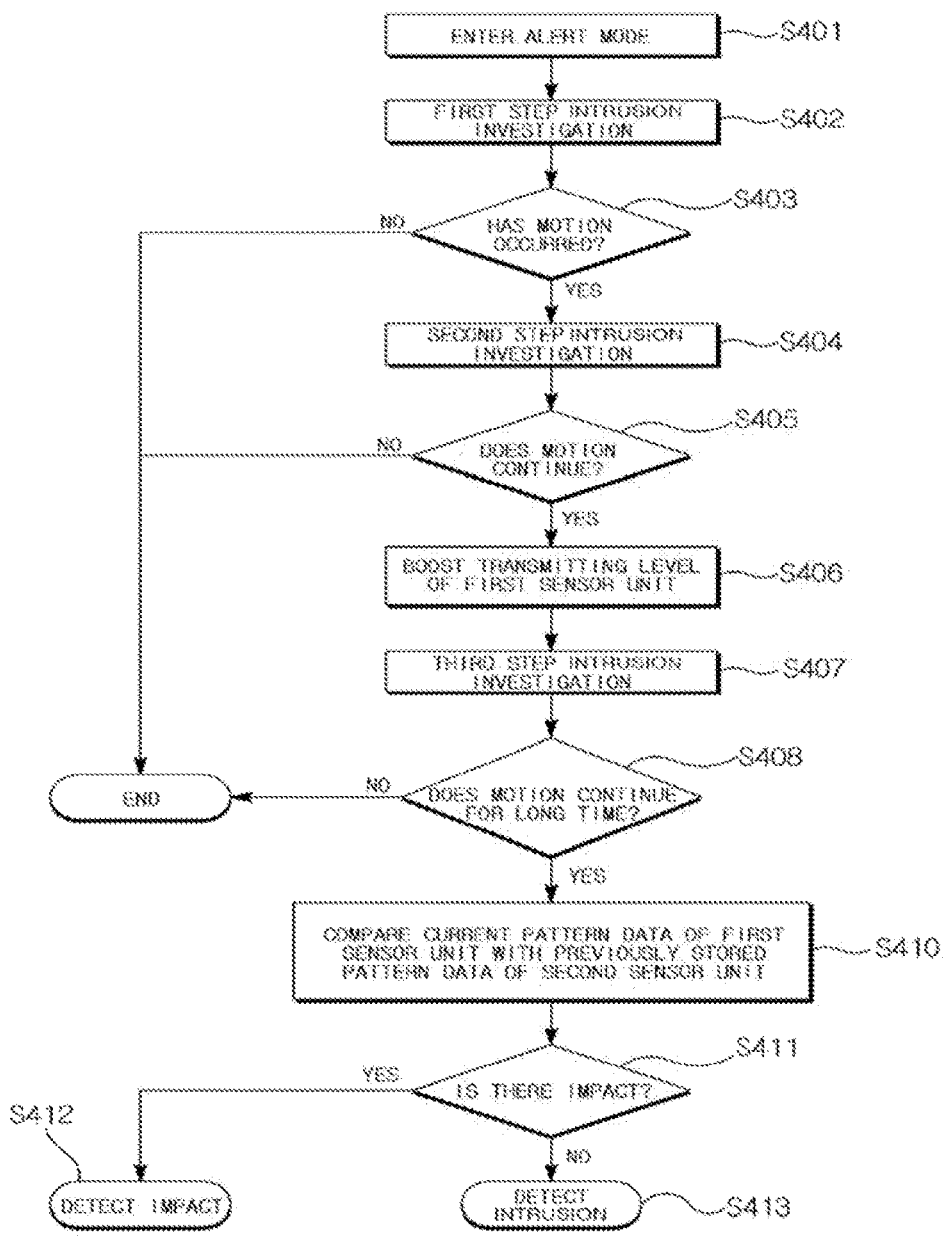
FIG. 4 is a schematic flowchart of a vehicle intrusion detection method in accordance with an embodiment of the present invention.

FIG. 4 is a schematic flowchart of a vehicle intrusion detection method in accordance with an embodiment of the present invention.

Referring to FIG. 4, the vehicle intrusion detection system according to the present embodiment checks the operating state of the off switch and the initial states of the first sensor unit and the second sensor unit. The check of the operating state of the off switch is for entering the alert mode when basic system information with the Body Control Module (BCM) is satisfied. An interface or communication between the vehicle intrusion detection system and an external BCM may be performed through Local Interconnect Network (LIN) communication.

If as a result of the check, the operating state of the off switch is activated or turned off, the vehicle intrusion detection system is deactivated or turned off, thus stopping operating. If the operating state of the off switch is not activated or turned off, the vehicle intrusion detection system enters the alert mode in accordance with a predetermined process and initiates a intrusion detection operation (S401).

When the control unit outputs a pulse width modulation signal after the vehicle enters the alert mode, the pulse width modulation signal is input to the transmitter through a transmission-side inverter. In the alert mode at normal times, the transmitter outputs a signal having a specific cycle and a specific width.

If there is no intrusion in the vehicle, a signal received through the receiver has a level waveform having a constant form and not having a change. In such a case, the control unit determines that there is no input regarding intrusion detection and does not notify the BCM of a separate alarm signal.

Meanwhile, if intrusion within the vehicle is detected for a preset first time, a signal received through the receiver has a level waveform having a varying amplitude and frequency. Furthermore, the received signal is filtered and amplified through the amplifier, an envelope is detected in the amplified signal so that the signal may be read by the control unit, and the level of the signal is converted into an analog level (corresponding to first step intrusion investigation) (S402, S403).

The input of such intrusion detection to the control unit may be determined depending on whether the level of the signal converted by an analog digital converter provided at the input terminal of the control unit is a preset reference level or more or less than the preset reference level.

Next, in order to switch to the alert mode for second step intrusion detection after the aforementioned first step intrusion detection, the control unit checks whether there is a motion detected as a specific level or more for a second time (corresponding to second step intrusion investigation) (S404, S405).

If there is a motion detected as the specific level or more for the second time, the control unit functions to send a second transmitting signal that has boosted a first transmitting, signal after the second step intrusion detection (S406). The second time interval of the second step intrusion investigation preferably is longer than the first time interval of the first step intrusion investigation.

If the boost function of the transmitter is used vehicle intrusion is detected in response to a signal that is intermittently transmitted at normal times, and third step intrusion detection is performed in response to a signal that is continuously transmitted after the second step intrusion detection. Accordingly, at normal times, a dark current consumed by the first sensor unit can be reduced compared to a case where a signal is continuously transmitted. The reduction of the dark current is very useful as a function of the vehicle intrusion detection system that has a limited capacity, such as the battery of a vehicle, connected to a power source and that is driven.

The control unit may compare the signal received from the first sensor unit with a preset value and transfer an alarm request signal to the BCM through LIN communication based on a result of the comparison.

Next in order to switch to the alert mode for the third step intrusion detection after the transmitting level of the first sensor unit is boosted, the control unit checks whether there is a continuous motion detected as a specific level or more for a third time (corresponding to third step intrusion investigation) (S407). The third time interval of the third step intrusion detection preferably is longer than the second time interval of the second step intrusion detection.

If there is no continuous motion detected as the specific level or more for the third time, the control unit may terminate a current alert mode and initialize the alert mode. Meanwhile, if there is continuous motion detected as the specific level or more for the third time, the control unit performs the following a pattern processing process (S408).

Next the control unit compares the current pattern data of the first sensor unit with the previously stored pattern data of the second sensor unit (S410) and determines whether the intrusion detection of first sensor unit results from an impact based on a result of the comparison (S411). Such steps (S410, S411) correspond to the pattern processing process. Furthermore, the control unit determines whether an impact has been detected or whether intrusion has been detected (S412, S413) based on a result of the determination.

The pattern processing process indicates that the determination of the intrusion detection based on the signal received from the first sensor unit is filtered based on the input signal from the second sensor unit. If the pattern processing process is used, the first sensor unit can be prevented from sensitively responding to an external simple impact against a vehicle body, etc. Furthermore, since the use of the second sensor unit used in the pattern processing process is increased, the movement or tilt of a vehicle body can be monitored or the deviation of tires from the ground can be detected using the alarm function for the tilt of the vehicle body. Such a pattern processing processor will be described in more detail below.

Figure 5:
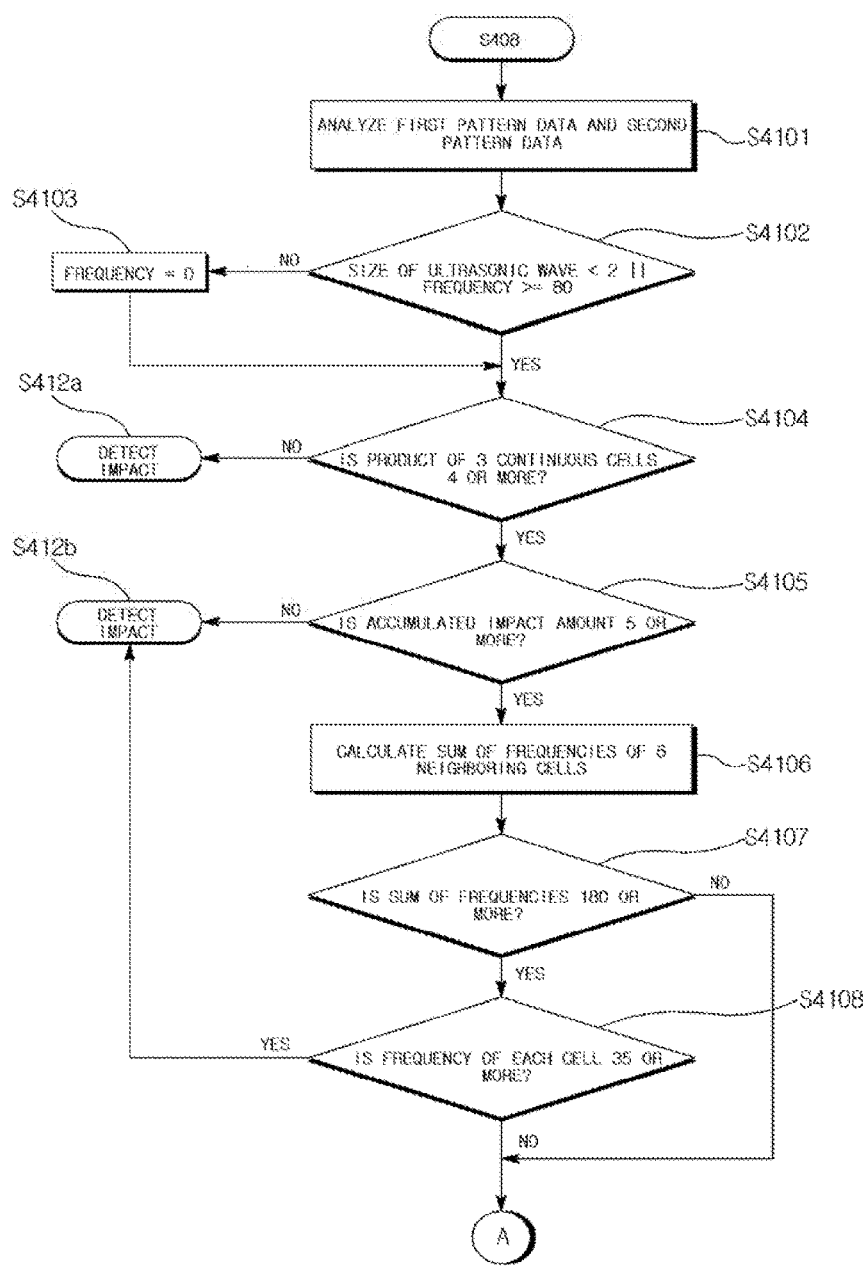
FIGS. 5 and 6 are flowcharts illustrating a pattern processing process that may be adopted in the vehicle intrusion detection method of FIG. 4.
Figure 6:
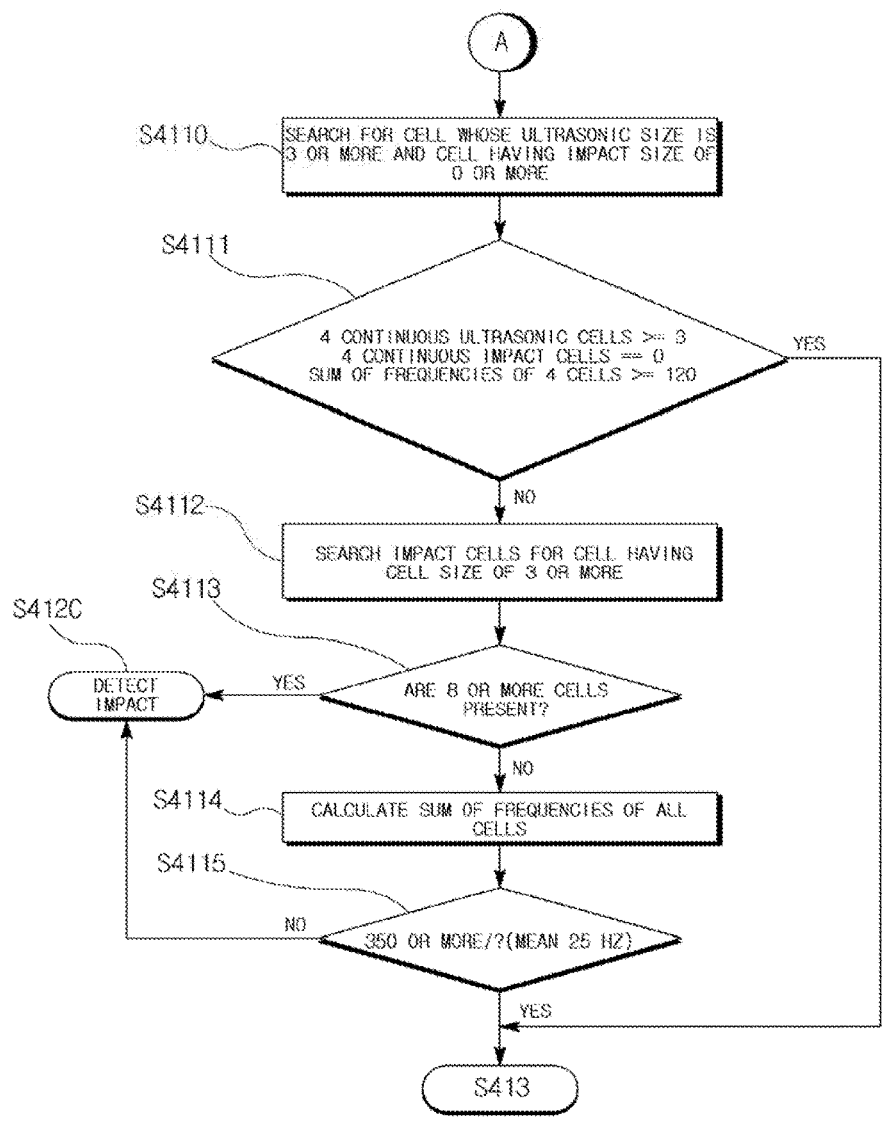

FIGS. 5 and 6 are flowcharts illustrating the pattern processing process that may be adopted in the vehicle intrusion detection method of FIG. 4.

Figure 7:
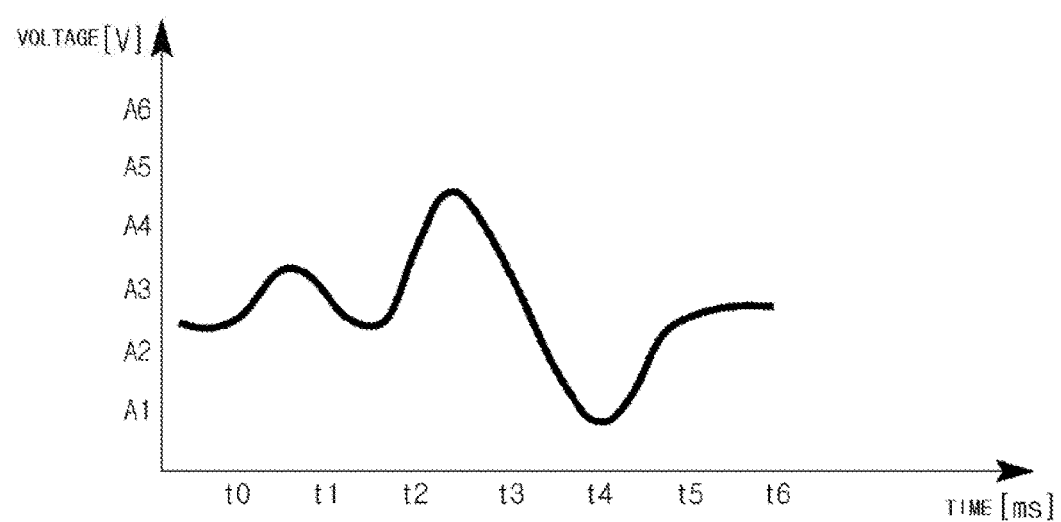
FIGS. 7 and 8 are graphs illustrating the boosting operating principle of a first sensor unit that may be adopted in the vehicle intrusion detection method of FIG. 4.
Figure 8:
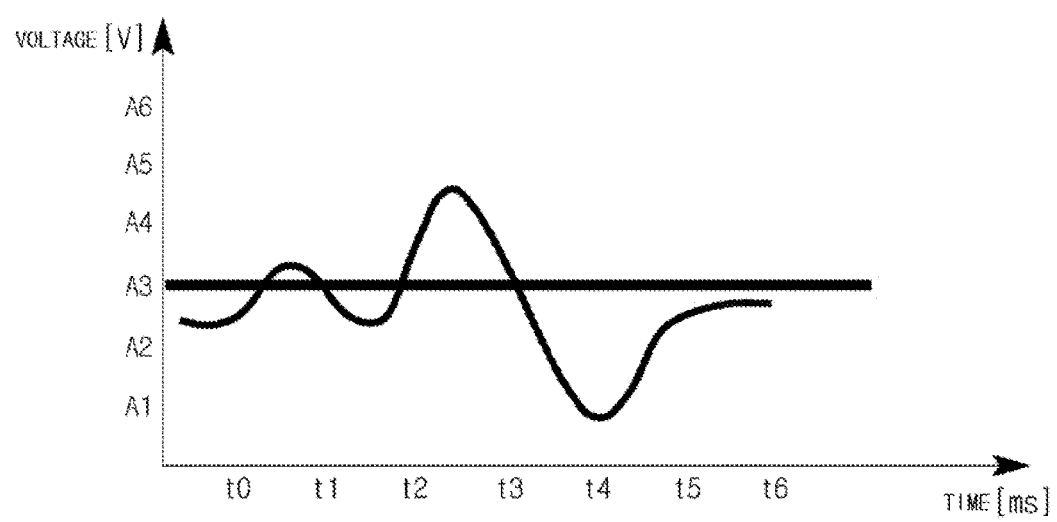

Referring to FIG. 5, the vehicle intrusion detection system analyzes first pattern data and second pattern data (S4101). In this case, the first pattern data is a set of signals that are input to the control unit in plural times within a preset time range and may be represented in the form of a voltage-time table or mapping table as illustrated in FIG. 7 or 8. Such a step (S4101) includes extracting the second pattern data that belongs to the pattern data of the second sensor unit previously stored in a specific storage unit within the system and that corresponds to the first pattern data, that is, the current pattern data of the first sensor unit and performing the following steps (S4102 to S4108).

First, the control unit determines whether the size of an ultrasonic signal input to the control unit is less than a preset size (e.g., 2) and the ultrasonic signal has a frequency of 80 Hz or more (S4102). If the size of the ultrasonic signal is 2 or more or the frequency is less than 80 Hz, the control unit sets the frequency to 0 and proceeds to the following step (S4103).

Next the control unit determines whether the product of continuous 3 cells of the first pattern data is 4 or more (S4104). If the product of the continuous 3 cells of the first pattern data is smaller than 4, the control unit determines that intrusion has not occurred (S4412a). That is, the control unit determines an impact in this case to be a simple external impact.

If the product of the continuous 3 cells of the first pattern data is 4 or more, the control unit determines whether the accumulated impact size of the continuous 3 cells corresponding to the second pattern data is 5 or more (S4105). If the accumulated impact size of the second pattern data is smaller than 5, the control unit determines that a simple external impact other than intrusion has been detected (S4412b).

If the accumulated impact size of the second pattern data is 5 or more, the control unit calculates the sum of the frequencies of 6 neighboring cells of the first pattern data (S4106). Furthermore, the control unit determines whether the calculated sum of the frequencies is 180 Hz or more or whether an average frequency is 30 Hz or more (S4107). Furthermore, if the sum of the frequencies is 180 Hz or more, the control unit determines whether the frequency of each cell is 35 Hz or more (S4108). If, as a result of the determination, the frequency of each cell of the first pattern data is determined to be 35 Hz or more, the control unit determines that intrusion detection attributable to the first pattern data results from an external impact other than actual intrusion (S4412b).

Next, as illustrated in FIG. 6, if, as a result of the determination at step (S4107, S4108), the frequency of each cell of the first pattern data is less than 35 Hz or the sum of 6 neighboring cells of the first pattern data is less than 180, cells whose size of the ultrasonic signal of the first pattern data is 3 or more and cells whose size of the impact signal of the second pattern data is 0 or more are searched for (S4110). Furthermore, the control unit determines whether in the first pattern data and the second pattern data, the size of the ultrasonic signal is 3 or more in four continuous cells, the sum of the frequencies of the four cells is 120 Hz or more, and the size of the impact signal complies with a condition in which the size of the impact signal is 0 in the four continuous four cells (S4111). If the size of the impact signal complies with the condition at step S4111, the control unit determines that vehicle intrusion has been detected (S413).

If the size of the impact signal does not comply with the condition at step S4111, the control unit searches for a cell that belongs to the cells whose size of the impact signal of the second pattern data is 0 or more and that has a size of 3 or more (S4112). Furthermore, the control unit determines whether the number of cells having, an impact size of 3 or more is 8 or more (S4113). If the number of cells having the impact size of 3 or more is 8 or more in the second pattern data, the control unit determines that the current first pattern data results from an external impact other than intrusion within the vehicle (S412C).

If the number of cells having the impact size of 3 or more is not 8 or more in the second pattern data, the control unit checks the sum of the frequencies of all the cells in the first pattern data (S4114). Furthermore, the control unit determines whether the sum of the frequencies of all the cells is 350 Hz or more or the mean frequency of all the cells is 25 Hz or more (S4115). If the sum of the frequencies of all the cells in the first pattern data is less than 350 Hz, the control unit determines whether the first pattern data results from an external impact other than intrusion within the vehicle (S412C). If, as a result of the determination, the sum of the frequencies of all the cells in the first pattern data is 350 Hz or more, the control unit determines whether intrusion within the vehicle has been detected according to such a pattern processing process (S413).

Figure 9:
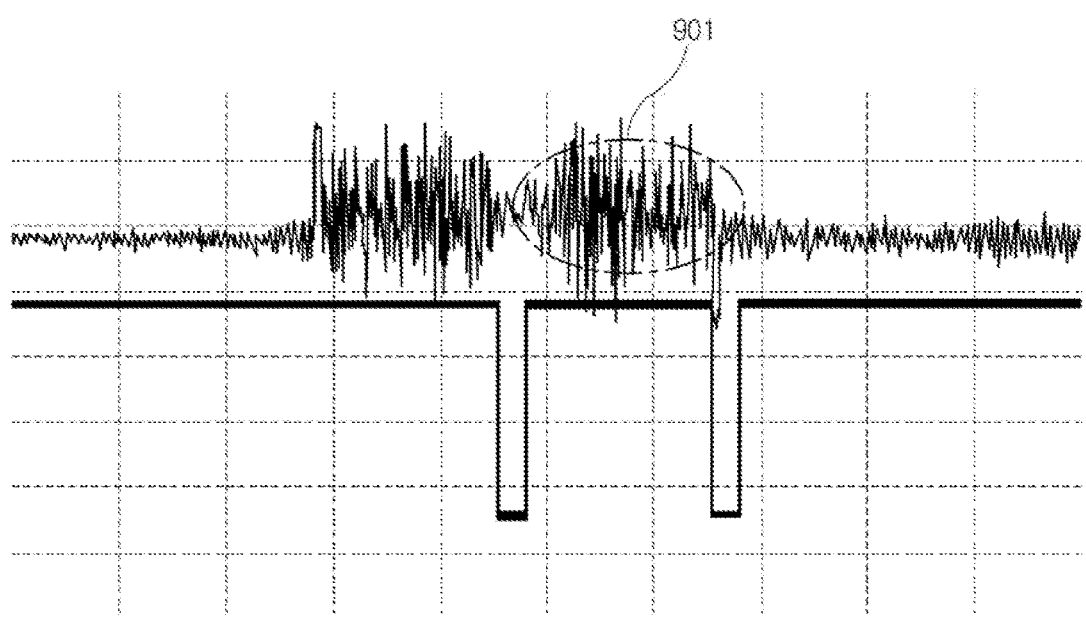
FIG. 9 is a graph illustrating an example of a signal detected by the receiver of the vehicle intrusion detection system of FIG. 1.

FIGS. 7 and 8 are graphs illustrating the boosting operating principle of the first sensor unit that may be adopted in the vehicle intrusion detection method of FIG. 4. FIG. 9 is a graph illustrating an example of a signal detected by the receiver of the vehicle intrusion detection system of FIG. 1.

Referring to FIG. 7, a signal input to the control unit from the first sensor unit is simplified and indicated on a voltage-time table indicating that reception data sampled at a preset sampling time interval belong to which voltage range in figures.

If the level of a signal input to the control unit from the first sensor unit from a time t0 to a time t2 is greater than a reference level, the control unit may boost the transmitting level of the transmitter of the first sensor unit for a specific time at the time t2. In this case, the reference level may be set to correspond to one of levels A1 to A6.

In the above case, if a signal exceeding the reference level is received from the first sensor unit from the time t0 to the time t2, the control unit may consider such a signal to be intrusion. Such intrusion detection corresponds to intrusion detection before the transmitting, level of the first sensor unit is boosted in the second step intrusion investigation. Furthermore, such intrusion detection may also be applied to the first step intrusion investigation.

In another embodiment, referring to FIG. 8, assuming that a specific level A3 is set as a reference level, if the sampling data of a signal input to the control unit from the first sensor unit at specific time intervals t0~t1, t1~t2, t2~t3, etc. moves above and below the reference level, the control unit may detect frequencies in the input signal.

For example, in FIG. 8, a single frequency datum is formed in the range from t0 to t3, and the greatest frequency component may be selected as a representative value by executing such formation four times. Such frequency data may be used to determine whether intrusion detection of a specific level or more is present in the second step intrusion investigation of FIG. 4.

Furthermore, the determination of the intrusion detection using the aforementioned frequency data is useful when the breaking of a vehicle window is detected. The reason for this is that as illustrated in FIG. 9, when a vehicle window is broken, many frequency components 901 are detected by the first sensor unit due to pieces of broken glass scattered inside and outside the vehicle and corresponding specific frequency data is included in a signal input to the control from the first sensor unit.

Figure 10:
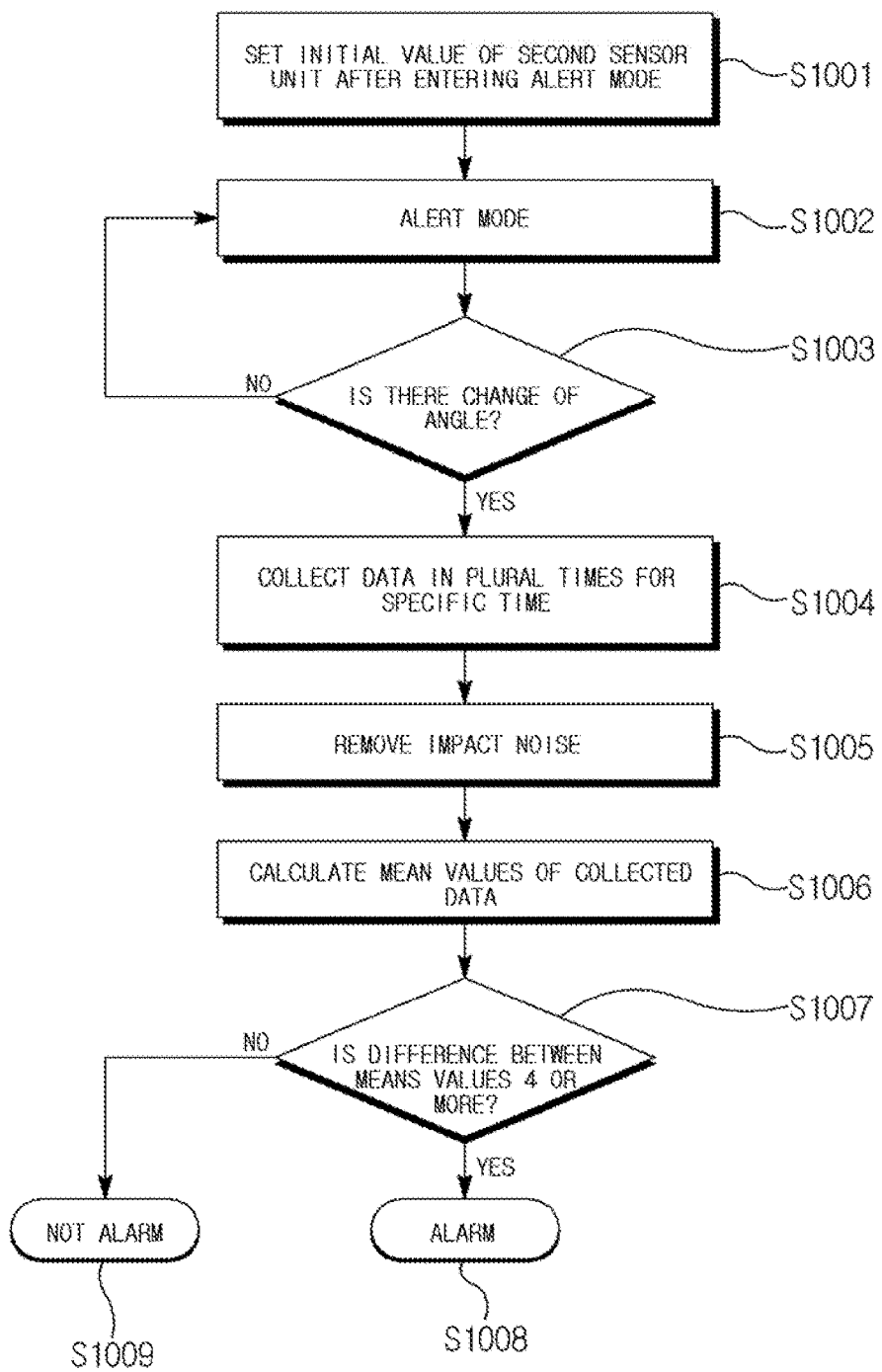
FIG. 10 is a flowchart for illustrating the operating principle of the second sensor unit of the vehicle intrusion detection system of FIG. 1.
Figure 11:
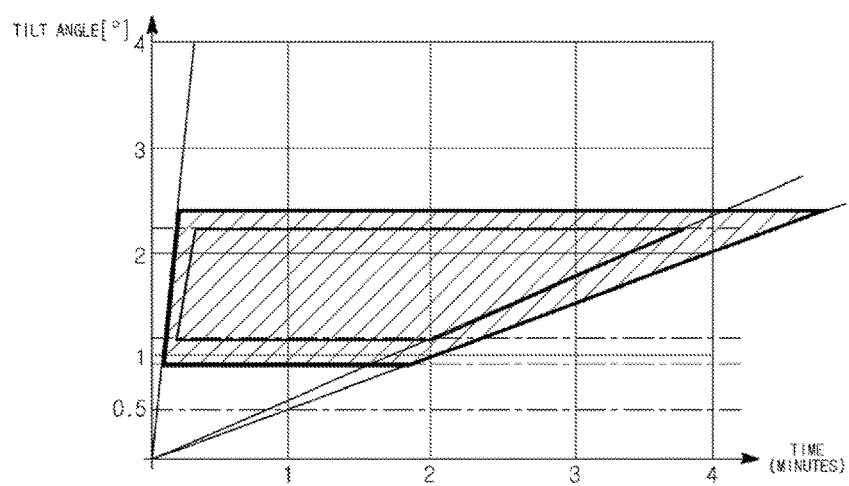
FIG. 11 is a diagram for illustrating a mapping table in which signals received from the second sensor unit of FIG. 1 have been stored.

FIG. 10 is a flowchart for illustrating the operating principle of the second sensor unit of the vehicle intrusion detection system of FIG. 1. FIG. 11 is a diagram for illustrating a mapping table in which signals received from the second sensor unit of FIG. 1 have been stored. Furthermore, FIG. 12 is a graph schematically illustrating the intrusion detection range of the second sensor unit of FIG. 1.

Referring to FIG. 10, after entering the alert mode, the control unit sets the initial value of the second sensor unit (S1001).

Next, the control unit determines whether there is a change of an angle in the alert mode (S1002, S1003). If there is no change of an angle, the control unit maintains the alert mode.

Next, the control unit collects data in plural times for a specific time (S1004). The specific time is time suitable to determine a simple external impact and may be about 1 second to 5 seconds. At step S1004, the control unit collects sampling data in a specific sampling cycle for a preset time interval.

Next, the control unit may remove impact noise according to a specific data collection criterion (S1005). For example, when a change of a specific angle is detected compared to a reference angle as illustrated in FIG. 11, the control unit may start collecting data or collect data only within a specific range of the angle (a slashed part in FIG. 11) compared to the reference angle through the second sensor unit. In such a case, a change of an angle exceeding the specific range corresponds to impact noise, which is removed from the collection data. Furthermore, the control unit of the vehicle intrusion detection system may remove impact noise by comparing current sampling data with sampling data sampled just before and discarding sampling data corresponding to a preset angle or more.

Next, the control unit calculates the mean values of the collected data (S1006). Furthermore, the control unit may operate to output an alarm through the BCM of the vehicle if a difference between the mean values is 4 or more and may operate to not output an alarm through the BCM if a difference between the mean values is less than 4 (S1007, S1008, S1009).

For example, the control unit may represent a change of an angle at a sampling point of time as an integer value represented by a specific step or level, as illustrated in FIG. 12. That is, in the table in which first to fifth sampling cycles correspond to horizontal items and reference angles in the X axis and Y axis of the second sensor unit versus the positive and the negative correspond to vertical items, a change of an angle for the first sampling cycle is substantially present only in a +X axis and the mean X1 of such angles corresponds to an integer value 9 represented by a specific step, a change of an angle for the second sampling cycle is substantially present in the +X axis and the mean X2 of such angles corresponds to an integer value 14 represented by a specific step, a change of an angle for the third sampling cycle is not substantially present and is the mean X3 of such angles corresponds to an integer value 0 represented by a specific step, a change of an angle for the fourth sampling cycle is substantially present in the +X axis and the mean X4 of such angles corresponds to an integer value 19 represented by a specific step, and a change of an angle for the fifth sampling cycle is substantially present only in the +X axis and the mean X5 of such angles corresponds to an integer value 18 represented by a specific step. In this case, the integer value 14 is a value preset in accordance with a specific reference tilt angle, and each of the sampling cycles may correspond to time obtained by dividing a reference time range in which a simple external impact is to be determined by 5.

In FIG. 12, sampling data in a −X axis, a +Y axis, and a −Y axis may be determined to be invalidated due to an unsatisfactory condition in the direction determination step. Furthermore, assuming that the reference value is less than 14 and a criterion for the number of determinations for a tilt is 3 or more, the control unit may determine that the vehicle has been inclined for the first to the fifth sampling cycles based on the sampling data X2, X4, and X5.

Meanwhile, in the aforementioned embodiment, it has been illustrated that after the first step intrusion investigation and the second step intrusion investigation since the alert mode is entered, the vehicle intrusion detection system boosts the transmitting level of the transmitter and performs the third step intrusion investigation. However, the present invention is not limited to such a construction. The vehicle intrusion detection system may be implemented to selectively perform only one of the first step intrusion investigation and the second step intrusion investigation.

The aforementioned embodiments are not intended to limit the scope of the present invention, but are intended to illustrate elements proposed in the claims of the present invention. An embodiment including an element that is included in the technical spirit written in the specification of the present invention and that may be substituted with an element of the claims may be included in the scope of the present invention.

The invention claimed is:

1. A vehicle intrusion detection system which is mounted on a vehicle and detects intrusion within the vehicle, comprising:
   a first sensor unit which detects light or a signal reflected by an object, generates a first detection signal, and outputs the generated first detection signal;
   a control unit which controls an operation of the first sensor unit and receives the first detection signal from the first sensor unit; and
   a second sensor unit which detects a rotation or inclination of the vehicle or an impact against the vehicle, generates a second detection signal, and inputs the generated second detection signal to the control unit,
   wherein the control unit detects intrusion within the vehicle or determines whether there is an external simple impact based on the first detection signal filtered based on the second detection signal.

2. The vehicle intrusion detection system of claim 1, wherein the first sensor unit comprises:
   a transmitter which outputs light or a signal of a specific cycle;

a receiver which receives light or a signal reflected by an object;

a signal processing unit which applies a transmitting signal to the transmitter in response to a signal processing control signal of the control unit; and a signal analysis unit which analyzes a signal received through the receiver.

3. The vehicle intrusion detection system of claim 2, wherein:

the first sensor unit comprises an ultrasonic sensor equipped with the transmitter and the receiver, and the second sensor unit comprises a gyro sensor or an impact sensor.

4. The vehicle intrusion detection system of claim 2, wherein:

the control unit detects vehicle intrusion based on the first detection signal by determining vehicle intrusion based on the first detection signal received through the first sensor unit and then determining whether the second detection signal from the second sensor unit is a specific level or more for a specific time, and if vehicle intrusion is detected based on the first detection signal, the control unit increases a transmitting level of the transmitter higher than a previous transmitting level of the transmitter when the intrusion is detected and investigates vehicle intrusion again.

5. The vehicle intrusion detection system of claim 4, wherein the control unit detects intrusion within the vehicle or an external simple impact based on at least one of an intensity of a signal and a change of a waveform in a voltage-time table indicating that the first detection signal sampled at a preset sampling time interval from the first sensor unit belongs to which voltage range, if an integer value of a specific level or more is within a range of a preset reference value in second pattern data within a table in which sampling data for a change of an angle sampled in plural times at specific intervals for a specific time from the second sensor unit are averaged and the averaged values are classified into specific steps.

6. The vehicle intrusion detection system of claim 1, wherein:

the first sensor unit and the second sensor unit are mounted on a single module, and the single module is mounted on an overhead console of the vehicle.

7. A vehicle intrusion detection method of detecting vehicle intrusion in a vehicle intrusion detection system comprising a first sensor unit which detects light or a signal reflected by an object, generates a first detection signal, and outputs the generated first detection signal, a control unit which controls an operation of the first sensor unit and receives the first detection signal from the first sensor unit, and a second sensor unit which detects a rotation or inclination of the vehicle or an impact against the vehicle, generates a second detection signal, and inputs the generated second detection signal to the control unit, the vehicle intrusion detection method comprising:

a first step of detecting vehicle intrusion based on the first detection signal by detecting vehicle intrusion based on the first detection signal received through the first sensor unit and then determining whether the second detection signal from the second sensor unit is a specific level or more for a specific time;

a second step of when the vehicle intrusion is detected based on the first detection signal increasing a transmitting level of a transmitter of the first sensor unit higher than a transmitting detected level when the intrusion is in the first step and investigating vehicle intrusion again; and a third step of if the vehicle intrusion is detected for a specific tilt or more in the second step, detecting intrusion within the vehicle or determining whether there is an external simple impact based on the first detection signal filtered based on the second detection signal.

8. The vehicle intrusion detection method of claim 7, wherein:

the first pattern data comprises a voltage-time table indicating that the first detection signal sampled at a preset sampling time interval from the first sensor unit belongs to which voltage range, the second pattern data comprises a table in which sampling data for a change of an angle sampled in plural times at specific intervals for a specific time from the second sensor unit are averaged and the averaged values are classified into specific steps, and the third step comprises detecting intrusion within the vehicle or an external simple impact based on at least one of an intensity of a signal and a change of a waveform in the voltage-time table if an integer value of a specific level or more in second pattern data within the table is within a range of a preset reference value.

* * * * *